United States Patent
Duret et al.

(10) Patent No.: US 8,112,234 B2
(45) Date of Patent: Feb. 7, 2012

(54) METHOD FOR ESTIMATING THE COMPONENTS OF THE FORCE TORSOR THAT ARE APPLIED TO A BEARING

(75) Inventors: Christophe Duret, Quintal (FR); David Kwapisz, Choisy (FR); Alexandre Laurent, Annecy le Vieux (FR)

(73) Assignee: SNR Roulements, Annecy (FR)

( * ) Notice: Subject to any disclaimer, the term of this patent is extended or adjusted under 35 U.S.C. 154(b) by 401 days.

(21) Appl. No.: 12/364,538

(22) Filed: Feb. 3, 2009

(65) Prior Publication Data

US 2009/0210172 A1    Aug. 20, 2009

(30) Foreign Application Priority Data

Feb. 8, 2008 (FR) ..................................... 08 00688

(51) Int. Cl.
*G01L 1/00* (2006.01)
*F16C 32/00* (2006.01)
*F16C 19/04* (2006.01)
*F16C 19/24* (2006.01)

(52) U.S. Cl. .............. 702/41; 702/42; 702/43; 384/448; 384/490; 384/548; 73/114.81

(58) Field of Classification Search ..................... 702/41
See application file for complete search history.

(56) References Cited

U.S. PATENT DOCUMENTS

2002/0057856 A1* 5/2002 Bailey et al. ................. 384/448
2005/0119840 A1* 6/2005 Astley et al. ................... 702/56

FOREIGN PATENT DOCUMENTS

| WO | 2005008204 A1 | 1/2005 |
| WO | WO2005/008204 | * 1/2005 |
| WO | 2005040745 A1 | 5/2005 |
| WO | WO2005/108945 | * 11/2005 |

OTHER PUBLICATIONS

International Search Report dated Oct. 13, 2008.

* cited by examiner

Primary Examiner — Jonathan Teixeira Moffat
Assistant Examiner — Rhadames J Alonzo Miller
(74) Attorney, Agent, or Firm — Bachman & LaPointe, P.C.

(57) ABSTRACT

A method is provided for estimating the components of the force torsor that are applied to a bearing, which method provides for the measurement of a vector ($V_m$) of N deformations and for the use of a physical model linking a vector (Q) of at most N representative values of the components of the torsor with a deformation measurement vector, the method comprises the following iterative steps: introduction of a vector (Q) of representative values into the model in order to calculate a deformation measurement vector ($V_c$); and carrying out a pertinence test (T) between the deformation measurement vector ($V_c$) which is calculated and the measured vector ($V_m$); if the test (T) is negative, establishing at least one new vector (Q) of representative values to be introduced into the model according to the result of the test; or if the test (T) is positive, storing the vector (Q) of introduced values; wherein the estimated components of the force torsor are established according to at least one stored vector (Q) of values.

12 Claims, 1 Drawing Sheet

METHOD FOR ESTIMATING THE COMPONENTS OF THE FORCE TORSOR THAT ARE APPLIED TO A BEARING

BACKGROUND (1) Field of the Invention

The invention relates to a method for estimating the components of a force torsor applied to a bearing comprising a fixed member, a rotary member and at least one row of rolling bodies arranged between said members in order to allow for their relative rotation.

In particular, the invention applies to motor vehicle wheel bearings, the fixed ring being intended to be attached to the frame of the vehicle, the wheel being intended to be rotatable by the intermediary of the rotating ring, and two rows of balls being provided between said rings.

(2) Prior Art

In many applications, in particular in relation with assistance and safety systems such as ABS or ESP, it is necessary to determine the forces that are applied to the interface between the wheel and the roadway on which said wheel rotates.

To do so, it is known to carry out measurements on the tyre or on the frame. However, the measurement on the tyre poses major problems linked to the instrumentation of a rotating part, in particular relative to:

the power supply of the sensors, because a battery does not have a sufficient lifespan;

the transmission of the signal, which must take place with a frequency and a reliability that are sufficient to be able to act on the assistance and safety systems. Even if solutions do exist, this wireless transmission becomes further complicated as the number of pieces of information to transmit is substantial and in that this information is to be received in real time;

the calculation of the forces in a fixed marking. It is in particular necessary to constantly know the position of the rotating marking in relation to the fixed marking.

Concerning measurement on the frame, this is made difficult by the distribution of the forces between the different members that connect the wheel to said frame (tie rod, A arm, shock absorber, etc.).

Consequently, as proposed in particular in FR-2 812 356, the fixed ring, which is the first linking member between the wheel and the frame, can be advantageously used as a support for the determination of the forces that are exerted at the interface between the wheel and the roadway during the displacements of the vehicle.

In particular, the determination of the forces is carried out by measuring the deformations of the fixed ring which are induced by the passing of the rolling bodies. Indeed, the amplitude of these deformations is representative of the forces transmitted by the bearing. However, the difficulty is to extract from the deformation measurements the information relative to the components of the force torsor that is applied on the bearing.

In order to attempt to resolve this problem, WO-2005/040745 presents an algorithm of which a portion is based on a neural network in order to form the link between the measurements of deformations and the components of the torsor. The disadvantage with this type of method, referred to as "black box", is its robustness with regards to situations which were not taken into account during the learning phase. Another blocking point is not taking the preload into account which is a factor of the first degree in the behaviour of the bearing, and all the more so in that this preload can vary over time with the change of the temperature but varies especially between different bearings in terms of manufacturing dispersions.

Moreover, WO-2005/008204 presents a method based on a physical model resulting from a finite element calculation, wherein:

the ball/ring contact forces are calculated using the resolution of said physical model according to the deformation measurements carried out; and the force torsor is calculated by adding the various contact forces together.

The first disadvantage of this method is the number of unknowns. Indeed, the system of equations to be solved comprises as unknowns all of the contact forces.

The second disadvantage stems from the frequency processing needed to elaborate an estimation of the components of the torsor. Consequently, this method does not provide a good level of performance in terms of bandwidth since it is based on a frequency expression of the behaviour of the bearing.

SUMMARY OF THE INVENTION

The invention aims to solve the problems of prior art by proposing in particular a method for estimating the components of the force torsor transmitted by a bearing, wherein, using deformation measurements of at least one zone of the fixed member of said bearing, a physical model of the bearing is used then inversed iteratively. This method furthermore makes it possible to limit the number of unknowns to be estimated and allows for a large bandwidth.

To that effect, the invention proposes a method for estimating the components of the force torsor that apply on a bearing comprising a fixed member, a rotary member and at least one row of rolling bodies arranged between said members in order to allow for their relative rotation, said method providing to measure a vector of N deformations of at least one zone of the fixed member of said bearing which are induced by said torsor and to use a physical model linking a vector of at most N representative values of the components of said torsor to a deformation measurement vector, said method comprising the following iterative steps:

introduction of a vector of representative values into the model in order to calculate a deformation measurement vector;

carrying out of a pertinence test between the deformation measurement vector which is calculated and said measured vector; and if the test is negative, establishing at least one new vector of representative values to be introduced into the model according to the result of said test; or if the test is positive, storing the introduced vector of values;

wherein the estimated components of the force torsor are established according to at least one stored vector of values.

BRIEF DESCRIPTION OF THE DRAWINGS

Other purposes and advantages of the invention shall appear in the following description, made in reference to the annexed figures, wherein.

DETAILED DESCRIPTION OF THE PREFERRED EMBODIMENT(S)

In relation with these figures, a method is described hereinbelow for estimating the components of the force torsor that are applied to a roller bearing. This embodiment is described in relation with an automobile vehicle wheel bearing comprising a fixed outer ring intended to be associated to the frame of the vehicle, a rotating inner ring on which the wheel and two rows of balls are intended to be mounted. However, the method according to the invention can be implemented on other types of roller bearings, as well as for other automobile applications or other applications.

During the displacement of the vehicle, the wheel rotates on the roadway, inducing forces at their interface, said forces being transmitted to the frame by the intermediary of the bearing. Consequently, the determination of these forces, in particular with the purpose of supplying the assistance and safety systems of the vehicle, can be carried out in temporal fashion by estimating the components of the force torsor that are applied to the bearing.

To do so, the method provides for measuring the deformations of the fixed ring which are induced by the force torsor that are applied to the bearing, in particular when the balls pass.

According to an embodiment, the measurements of the deformations can be carried out according to one of FR-2 869 980, FR-2 869 981, FR-2 869 982 or FR-2 869 966, i.e. by having deformation gauge bars on privileged zones of the periphery of the fixed ring. Indeed, the gauges as such each deliver a pseudo-sinusoidal time signal which is a function of the deformations of said zone, said signals able to be conditioned in order to determine the amplitude of the deformations that are undergone. However, the invention is not limited to one particular location and/or to one conditioning of the gauges to measure the deformations of the fixed ring.

In the embodiment described, a vector $V_m$ of N deformations of at least one zone of the fixed ring is measured. In particular, N zones of the fixed ring can each be instrumented with a gauge bar, in such a way as to deliver N deformation amplitudes which are independent.

The method provides for the use of a physical model linking a vector Q of at most N representative values of the components of the torsor to a vector of N deformation measurements. As such, by introducing such a vector of representative values into the model, it is possible to calculate a deformation measurement vector.

According to an embodiment, the vector Q of representative values comprises five variables respectively following a degree of association of the bearing, the degree of additional freedom to the degrees of association corresponding to the rotation of the inner ring in the outer ring according to the axis of rotation of the bearing. In particular, these five variables can be chosen from among the components of the force torsor or the displacements of the rotating ring in relation to the fixed ring.

Figure 1:
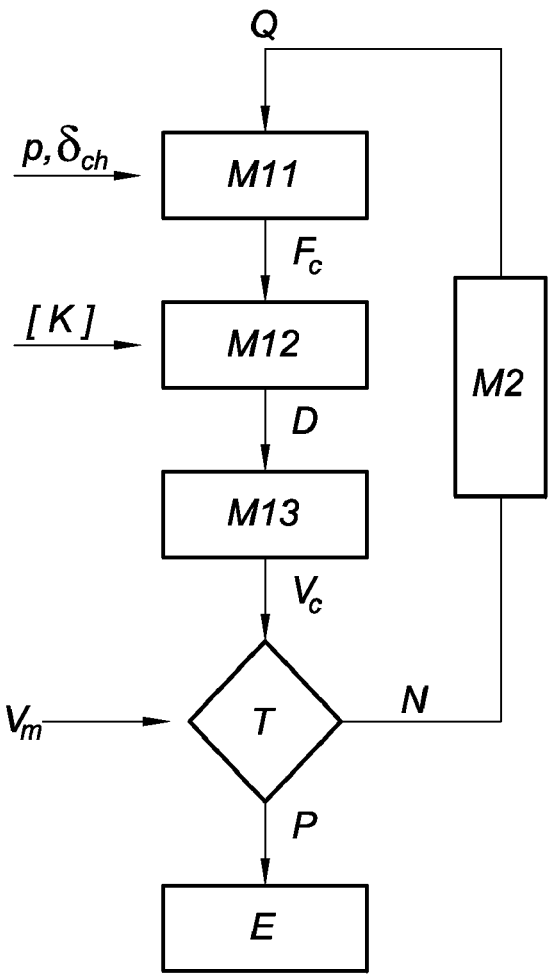
FIG. 1 is a block diagram of the implementation of the method for estimating according to an embodiment of the invention.

In relation with the use of these variables, FIG. 1 shows a physical model comprising three modules M11, M12, M13 of respectively of the link between the vector Q and of the load zone, of the link between the load zone and the deformations of the fixed member and of the transfer function of the measurement sensor.

The module M11 for modelling of the link between the vector Q and of the load zone makes it possible to mathematically link the introduced variables, i.e. the components of the torsor or the displacements, with the contact forces $F_c$ between each of the balls and the fixed ring in such a way as to determine said contact forces. In particular, this relation makes it possible to reduce the number of variables to be estimated, in particular between five and eight in the embodiment described.

Indeed, the transmission of the forces in a bearing take place via the rolling bodies in such a way that the torsor transmitted by the bearing can be broken down into a set of ball/ring contact forces. This distribution is accomplished according to physical laws that involve the geometrical parameters of the bearing, the materials that comprise the various elements of the bearing, as well as the preload.

An important variable in this distribution is the angular configuration θ of the balls in each of the rows in relation to a fixed marking.

Many models, present in literature, describe the non-linear laws that govern this distribution. The material and geometric parameters are contained in the vector p and the preload represented by $\delta_{ch}$. The angular configurations of the balls of the two rows are respectively represented by the angles $\theta_1$ and $\theta_2$.

In the embodiment shown, the vector Q of the representative values further comprises the angles $\theta_1$ and $\theta_2$, the preload $\delta_{ch}$ as well as the vector p being fixed. As such, the implementation of the method makes it possible together to estimate the value of the angles $\theta_1$ and $\theta_2$. Alternatively, in the case where the preload is a poorly known parameter that is also desired to estimate, the vector of values can further include said preload. According to another alternative, the angles $\theta_1$ and $\theta_2$ can be determined moreover to then be introduced into the model.

The module M12 of modelling of the link between the load zone and the deformations of the fixed member makes it possible to estimate the deformations D of the instrumented zones of the fixed member which are induced by the contact forces $F_c$ determined in the preceding module.

The contact forces $F_c$ are applied to the fixed ring and are balanced by reaction forces to the links of said ring. They as such generate a deformation of the fixed ring according to the classic laws of continuum mechanics. The model M12 of deformation of the fixed ring can be obtained by finite elements or by experimental identification of stiffness factors [K] which are needed for said module.

According to an embodiment, the contact forces $F_c$ can be expressed in modal form in order to estimate the deformations of the zone of the fixed member. As such, the contact forces $F_c$ are in a more compact and more practical form for the calculation. For example, the Fourier series can be calculated, according to the angle θ, of the contact forces $F_c$ in order to obtain the modal expression of the contact forces, the module then using the associated modal stiffness factors. The output of the module then provides a modal representation of the deformation of the fixed ring on instrumented zones.

The module M13 makes it possible to determine in fine the measurements associated with the deformations D estimated by the preceding module by modelling in particular the transfer function of the deformation sensor and of its electronic packaging.

The modules M12 and M13 can furthermore be partially or totally grouped together in such a way as to simplify the experimental identification of stiffness factors [K] which are necessary for said modules.

In order to estimate the components of the torsor, the method comprises the following iterative steps:

introduction of a vector Q of representative values into the model in order to calculate a deformation measurement vector $V_c$;

carrying out of a pertinence test T between the deformation measurement vector $V_c$ which is calculated and said measured vector $V_m$; and if said test is negative N, establishing at least one new vector Q of representative values to be introduced into the model according to the result of said test; or if said test is positive P, storing the vector Q of introduced values.

As such, by introducing a first vector Q in the model, it is possible to iteratively refine the variables of said vector until an acceptable estimation of said variables is obtained. Furthermore, it is possible to initially introduce into the model a vector Q established a priori or, in order to limit the number of iterations, a vector Q of which the variables stem from the estimation carried out at the preceding instant or at some of the preceding instants. Moreover, according to the needs of the system using the force torsor, the frequency of implementing the method can be adapted.

At the end of the iteration, the module E establishes the estimated components of the force torsor according to at least one stored vector Q of values. In the case where the variables of the vector Q are the components of the torsor, the establishment is immediate and, in the case where said variables are the displacements, the establishment can be carried out by adding together for example all of the contact forces $F_c$ calculated by the module M11.

Two alternatives are described hereinbelow for the establishment of at least one new vector Q of representative values to be introduced into the model according to the result of said test, wherein the model is irreversible respectively by minimisation of the residue and set inversion. As such, this establishment does not require successive measurements of deformations, is such a way as to preserve the potential bandwidth. Furthermore, the method takes into account the non-linear nature of the equations of the module M11 in order to converge iteratively to the estimation of the components of the torsor.

According to the first alternative (FIG. 1), the pertinence test T comprises the determination of the differences between the deformation measurements calculated and said measurements which are carried out in the same interval of time.

As such, by determining a threshold value corresponding to the accuracy of the estimation, the test is negative N in the case where a difference is greater than said threshold value and positive P otherwise. Consequently, as long as the threshold of the pertinence test T is not reached, the iteration continues.

Moreover, in order to inverse the model, the method provides a module M2 using a cost function based on the equations of said model, said function being minimised with the differences determined in such a way as to establish the new vector Q of representative values which best offsets said differences. To do so, methods of the least squares, quasi-Newton, gradient or extreme value search type can be used.

Figure 2:
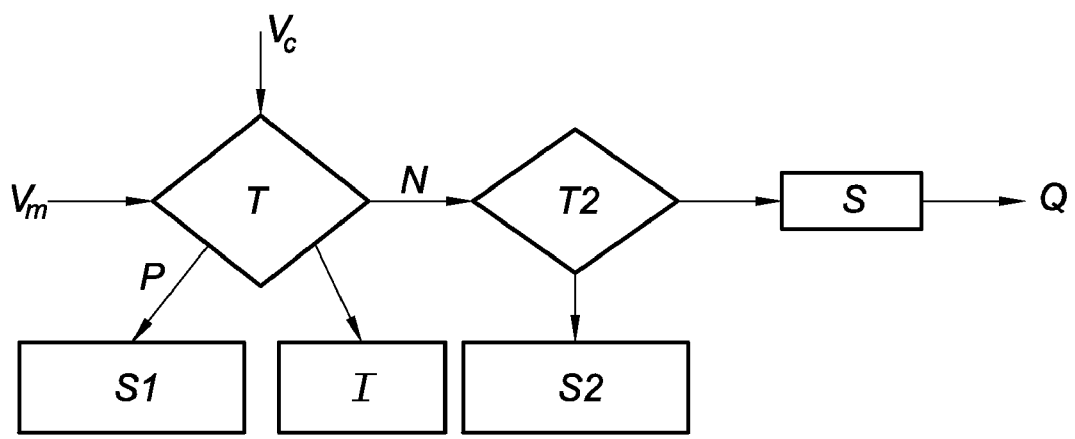
FIG. 2 is a block diagram of an alternative of the method according to FIG. 1, said diagram showing the steps of testing and of establishing of the new vector of representative values to be introduced into the model.

According to the second alternative (FIG. 2), the set inversion is carried out by using representative values which are in the form of an interval determined a priori. The pertinence test T as such comprises a test of inclusion of the measurement interval vector $V_c$ calculated in said interval vector $V_m$ which is measured. In particular, the interval of measured values can correspond with the accuracy of the measurement.

In this alternative of the method for estimating, the test T is considered as negative N in the event of a partial inclusion, and as positive P in the event of total inclusion. In the latter case, the corresponding vector Q is stored in the module S1. Moreover, in the event of exclusion, the vector Q of corresponding values is invalidated, in particular by being stored in the module I, in such a way as to be eliminated from the iteration.

In the event of a negative test N, a test T2 of the size of the intervals of the vector Q is carried out, then, in the event of a size of an interval exceeding a threshold, said interval is split in the module S in order to establish two new value interval vectors Q each to be introduced into the model. According to an embodiment, only the largest interval is split. Moreover, in the case where the respective sizes of all of the intervals are less than the threshold, the vector is stored in the module S2 as an undetermined vector since it is not known whether or not it is pertinent.

At the end of all of the iterations, several vectors Q can be stored and the estimated components of the force torsor are then established by grouping said stored vectors together.

The method according to the invention can be implemented by using several time measurements in order to estimate the components of a force torsor at an instant. To do so, a filtering of the estimation of the components of the force torsor can be used, for example a filtering of the stored estimations, a filtering of the estimations of the intermediary variables and/or a filtering of the measurements carried out.

Alternatively, state estimators (of the Kalman Filter type for example) can be used. This requires a priori some knowledge about the system (for example: the variation in the speed of the ball retention cage does not exceed a certain value) or the introduction of additional measurements (for example: measuring the wheel speed wheel providing information on the speed of the ball retention cage or temperature sensor). This knowledge is merged with that stemming from the measurement via deformation gauges with the purpose of refining the estimation of the components of the torsor. This merger can take place either by modifying the cost function of the module M2 or by adding mathematical constraints in the set inversion.

The invention claimed is:

1. A method for estimating components of a force torsor that are applied to a bearing comprising a fixed member, a rotary member and at least one row of rolling bodies arranged between said members in order to allow for their relative rotation, said method comprising:

measuring a vector ($V_m$) of N deformations of at least one zone of the fixed member of said bearing which are induced by said torsor and using a physical model linking a vector (Q) of at most N representative values of components of said torsor to a deformation measurement vector, said method further comprising the steps of:

introducing a vector (Q) of representative values into the model in order to calculate a deformation measurement vector ($V_c$);

carrying out a pertinence test (T) with processor between the deformation measurement vector ($V_c$) which is calculated and said measured vector ($V_m$); and if the test (T) is negative, establishing at least one new vector (Q) of representative values to be introduced into the model according to the result of said test; or if the test (T) is positive, storing the introduced vector (Q) of values, wherein the estimated components of the force torsor are established according to at least one vector (Q) of stored values, wherein the physical model comprises three modules of modelling (M11, M12, M13), respectively, the link between the vector (Q) and of the measured zone of the fixed member, the link between the measured zone of the fixed member and the deformations of the fixed member and the transfer function of the measurement sensor, the calculation of the deformation measurement vector ($V_c$) being carried out by these modules in order to successively determine the contact forces ($F_c$) between the rolling bodies and the fixed member, the estimation of the deformations (D) of the zone of the fixed member which are induced by said contact forces and the measurements associated with said deformations.

2. The method for estimating set forth in claim 1, wherein the vector (Q) of representative values comprises five variables respectively following a degree of association of the bearing, a degree of additional freedom to the degree of association corresponding to rotation of an inner ring in an outer ring according to an axis of rotation of the bearing.

3. The method for estimating set forth in claim 2, further comprising selecting the variables from among the components of the force torsor or the displacements of the rotary member in relation to the fixed member.

4. The method for estimating as set forth in claim 1, wherein the vector (Q) of representative values further comprises the angle of the rolling bodies relative to the center of the bearing in each of the rows of rolling bodies.

5. The method for estimating as set forth in claim 4, wherein the vector (Q) of representative values further comprises the preload ($\delta_{ch}$) of the bearing.

6. The method for estimating set forth in claim 1, wherein the contact forces ($F_c$) are expressed in modal form in order to estimate the deformations (D) of the zone of the fixed member.

7. The method for estimating as set forth in claim 1, wherein the pertinence test (T) comprises determining differences between the calculated deformation measurements and said measurements carried out, said test being negative in the case where a difference is greater than a threshold value and positive otherwise.

8. The method for estimating set forth in claim 7, further comprising using a cost function based on the equations of the model, said function being minimized with the differences determined in such a way as to establish the new vector (Q) of representative values which best offsets said differences.

9. The method for estimating as set forth in claim 1, further comprising providing the representative values in the form of an interval, the pertinence test (T) comprising a test of inclusion of the deformation measurement vector ($V_c$) which is calculated in said measured vector ($V_m$), said test being negative in the event of partial inclusion and positive in the event of total inclusion.

10. The method for estimating set forth in claim 9, further comprising in the event of a negative test, carrying out a test (T2) of the size of the intervals of the value interval vector (Q) and then, in the event of a size of an interval greater than a threshold, splitting said interval in order to establish two new value interval vectors (Q) to be introduced.

11. The method for estimating set forth in claim 10, further comprising establishing the estimated components of the force torsor by grouping stored vectors (Q) together.

12. The method for estimating as set forth in claim 1, further comprising filtering the estimation of the components of the force torsor.

* * * * *